(12) United States Patent
Shimazu (10) Patent No.: US 10,156,724 B2
(45) Date of Patent: Dec. 18, 2018

(54) HEAD-MOUNTED DISPLAY, INFORMATION PROCESSING APPARATUS, INFORMATION PROCESSING SYSTEM, AND CONTENT DATA OUTPUTTING METHOD

(71) Applicant: Sony Interactive Entertainment Inc., Tokyo (JP)

(72) Inventor: Takashi Shimazu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/561,638

(22) PCT Filed: May 6, 2016

(86) PCT No.: PCT/JP2016/063678
§ 371 (c)(1),
(2) Date: Sep. 26, 2017

(87) PCT Pub. No.: WO2016/181909
PCT Pub. Date: Nov. 17, 2016

(65) Prior Publication Data
US 2018/0074321 A1   Mar. 15, 2018

(30) Foreign Application Priority Data
May 13, 2015   (JP) ................................ 2015-098394

(51) Int. Cl.
*G09G 5/00*      (2006.01)
*G02B 27/00*    (2006.01)
(Continued)

(52) U.S. Cl.
CPC ......... *G02B 27/0172* (2013.01); *G02B 27/02* (2013.01); *G02B 27/2228* (2013.01);
(Continued)

(58) Field of Classification Search
CPC ............... G02B 27/0172; G02B 27/02; G02B 27/2228; H04N 5/64; H04N 13/344; H04N 13/31; G09G 5/36; G09G 5/00
See application file for complete search history.

(56) References Cited

U.S. PATENT DOCUMENTS

| 2006/0028400 A1 | 2/2006 | Lapstun |
| 2006/0119539 A1* | 6/2006 | Kato ................... G02B 27/0176 345/8 |

(Continued)

FOREIGN PATENT DOCUMENTS

| JP | 2004236191 A | 8/2004 |
| JP | 2007003848 A | 1/2007 |

(Continued)

OTHER PUBLICATIONS

International Search Report for corresponding PCT Application No. PCT/JP2016/063678, 4 pages, dated Jul. 5, 2016.

(Continued)

*Primary Examiner* — Muhammad N Edun
(74) *Attorney, Agent, or Firm* — Matthew B. Dernier, Esq.

(57) ABSTRACT

An image in content data to be sent out from an information processing apparatus to an HMD is configured such that images obtained by performing correction for left and right parallax images taking distortion of an image by a lens provided in the HMD into consideration are juxtaposed side by side. Further, graphics are displayed in regions of the image, which are invisible when the image is viewed through the lens, and a notification matter from the information processing apparatus is embedded into the graphics depending upon the color, pattern, and shape. The HMD specifies the notification matter corresponding to the graphics and changes the later output mode.

8 Claims, 7 Drawing Sheets

(51) Int. Cl.
    *G02B 27/01*    (2006.01)
    *G02B 27/02*    (2006.01)
    *G09G 5/36*     (2006.01)
    *H04N 5/64*     (2006.01)
    *H04N 13/344*   (2018.01)
    *H04N 13/31*    (2018.01)
    *G02B 27/22*    (2018.01)

(52) U.S. Cl.
    CPC ............... *G09G 5/00* (2013.01); *G09G 5/36* (2013.01); *H04N 5/64* (2013.01); *H04N 13/31* (2018.05); *H04N 13/344* (2018.05)

(56) References Cited

U.S. PATENT DOCUMENTS

| | | | |
|---|---|---|---|
| 2007/0046776 A1 | 3/2007 | Yamaguchi | |
| 2010/0103075 A1 | 4/2010 | Kajaboukis | |
| 2013/0183021 A1 | 7/2013 | Osman | |
| 2014/0035951 A1 | 2/2014 | Martellaro | |
| 2016/0116745 A1* | 4/2016 | Osterhout | G06F 3/03547 |
| | | | 359/614 |
| 2016/0116979 A1* | 4/2016 | Border | G06F 3/013 |
| | | | 345/156 |

FOREIGN PATENT DOCUMENTS

| | | |
|---|---|---|
| JP | 2007097129 A | 4/2007 |
| JP | 2011128460 A | 6/2011 |
| JP | 2014093704 A | 5/2014 |
| WO | 2013001590 A1 | 1/2013 |

OTHER PUBLICATIONS

International Preliminary Report on Patentability and Written Opinion for corresponding PCT Application No. PCT/JP2016/063678, 11 pages, dated Nov. 23, 2017.

Extended European Search Report for corresponding EP Application No. 16792634.4, 13 pages, dated Oct. 8, 2018.

Gia M Agusta et al: "QR Code Augmented Reality tracking with merging on conventional marker based Backpropagation neural network". Advanced Computer Science and Information Systems (ICACSIS). 2012 International Conference On. IEEE. pp. 245-248 (Dec. 1, 2012).

* cited by examiner

| POSITION | GRAPHICS | INFORMATION |
|---|---|---|
| (0, 0) | RED RECTANGLE | PROPER |
| (3, 0) | OTHER THAN THE ABOVE | IMPROPER |
| (1, 0) | GREEN VERTICAL STRIPES | LUMINANCE: DECREASE |
| (2, 0) | GREEN HORIZONTAL STRIPES | LUMINANCE: INCREASE |
| ... | ... | ... |

FIG. 8

ND-MOUNTED DISPLAY, INFORMATION
PROCESSING APPARATUS, INFORMATION
PROCESSING SYSTEM, AND CONTENT
DATA OUTPUTTING METHOD

TECHNICAL FIELD

The present invention relates to an output technology of electronic contents including image display.

BACKGROUND ART

A head-mounted display (Head Mounted Display, hereinafter referred to as "HMD") that displays video in front of the eyes of a user who has the HMD mounted on the head thereof is practically used. In recent years, an HMD that displays parallax images on the left and right eyes of the user to present a stereoscopic image and another HMD that traces a movement of the head of the user and reflects a result of the trace on the video to give an immersion feeling in a virtual space or the feeling of being at the site have been proposed (for example, refer to PTL 1).

CITATION LIST

Patent Literature

[PTL 1] JP 2014-93704 A

SUMMARY

Technical Problem

Although an HMD can provide the feeling of being at the site to a represented world in comparison with general display units, if the user immerses in the represented word by the HMD too much, then the user is likely to lose an objective view point on an output state of video or audio. For example, with the HMD, such a situation that, even if the parallax between parallax images is not appropriate or the luminance of the screen is excessively high or excessively low, the user cannot objectively decide the fact and continues watching, which gives rise to abnormality of the physical condition of the user, is likely to occur in comparison with a general display unit. Further, since it is difficult for a person other than the mounting person of the HMD to check an output state of the HMD, a negative influence is had by a user whose judgment is immature such as a child before the user notices it.

The present invention has been made in view of such a subject as described above, and it is an object of the present invention to provide a technology capable of providing a usually appropriate viewing environment in content outputting in which an HMD is used.

Solution to Problem

An aspect of the present invention relates to a head-mounted display. This head-mounted display is a head-mounted display including a lens provided on a front face of a display panel, the head-mounted display including an inputting unit configured to acquire content data outputted from an information processing apparatus, an invisible region confirmation unit configured to confirm an image represented in a region that is invisible when a user views through the lens from within a frame of a moving image included in the content data to specify a notification matter from the information processing apparatus, and an outputting unit configured to perform one of changes in output mode of the content data including output stop based on the notification matter.

Another aspect of the present invention relates to an information processing apparatus. This information processing apparatus includes an output data generation unit configured to generate data to be outputted to a head-mounted display that includes a lens on a front face of a display panel and represent an image indicating that the data is proper in a region, which is invisible when a user views through the lens of the head-mounted display, within a frame of a moving image included in the data to generate final content data, and an outputting unit configured to output the content data generated by the output data generation unit to the head-mounted display.

A further aspect of the present invention relates to an information processing system. This information processing system is an information processing system including a head-mounted display that includes a lens on a front face of a display panel and an information processing apparatus that generates content data to be outputted to the head-mounted display. The information processing apparatus includes an output data generation unit configured to generate data to be outputted to the head-mounted display and represent an image indicating that the data is proper in a region, which is invisible when a user views through the lens of the head-mounted display, within a frame of a moving image included in the data to generate final content data, and an outputting unit configured to output the content data generated by the output data generation unit to the head-mounted display. The head-mounted display includes an inputting unit configured to acquire content data outputted from the information processing apparatus, an invisible region confirmation unit configured to confirm an image represented in a region that is invisible from within a frame of a moving image included in the content data to specify a notification matter from the information processing apparatus, and an outputting unit configured to perform one of changes in output mode of the content data including output stop based on the notification matter.

A still further aspect of the present invention relates to a content data outputting method. This content data outputting method is a content data outputting method by a head-mounted display that includes a lens on a front face of a display panel. The content data outputting method includes a step of acquiring content data outputted from an information processing apparatus, a step of confirming an image represented in a region that is invisible when a user views through the lens from within a frame of a moving image included in the content data to specify a notification matter from the information processing apparatus, and a step of performing one of changes in output mode of the content data including output stop based on the notification matter.

Also a yet further aspect of the present invention relates to a content data outputting method. This content data outputting method includes a step of generating data to be outputted to a head-mounted display that includes a lens on a front face of a display panel and representing an image indicating that the data is proper in a region, which is invisible when a user views through the lens of the head-mounted display, within a frame of a moving image included in the data to generate final content data, and a step of outputting the generated content data to the head-mounted display.

It is to be noted that also arbitrary combinations of the components described above and conversions of the representation of the present invention between a method, an apparatus, a system, a computer program, a recording medium in which the computer program is recorded and so forth are effective as modes of the present invention.

Advantageous Effect of Invention

With the present invention, a content using the HMD can be viewed usually in an appropriate state.

DESCRIPTION OF EMBODIMENT

Figure 1:
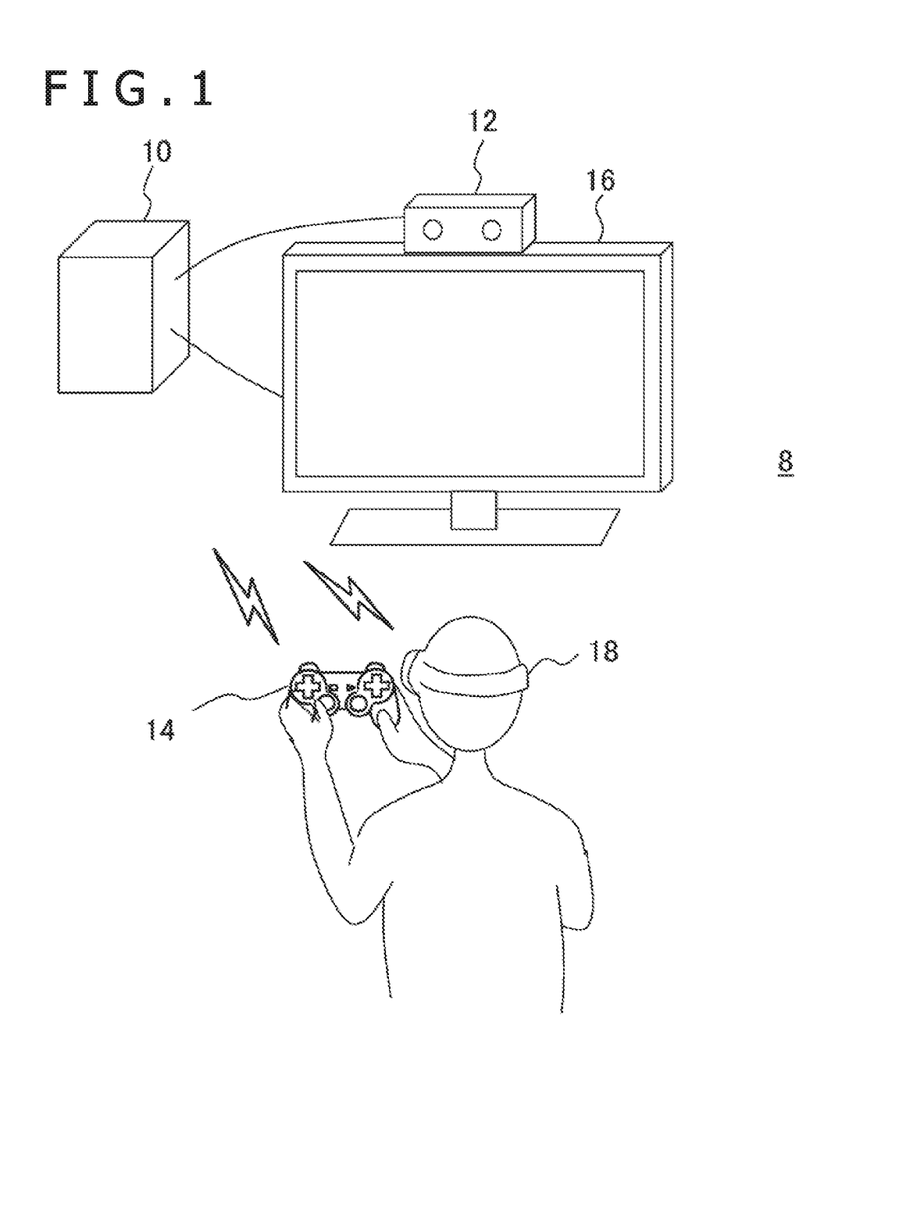
FIG. 1 is a view depicting an example of a configuration of an information processing system for which a present embodiment can be applied.

FIG. 1 depicts an example of a configuration of an information processing system to which the present embodiment can be applied. In this example, the information processing system 8 includes an image pickup apparatus 12 that picks up an image of a target, an information processing apparatus 10 that performs information process on the basis of a picked up image, a flat panel display 16 that displays an image obtained as a result of the information process, an HMD 18 to be mounted by a user, and an inputting apparatus 14 to be operated by the user.

The information processing apparatus 10 may be connected to the image pickup apparatus 12, the inputting apparatus 14, the flat panel display 16, and the HMD 18 by a cable or by a known wireless communication technology such as Bluetooth (registered trademark). Further, depending upon an information process to be carried out by the information processing apparatus 10, the image pickup apparatus 12, the flat panel display 16, and the inputting apparatus 14 may not be provided. Further, the appearance shape of those apparatus is not limited to that depicted in the drawings.

The image pickup apparatus 12 includes a camera that picks up an image of a target such as a user at a predetermined frame rate and a mechanism that performs common processes such as a demosaic process for an output signal of the camera to generate output data of a picked up image and sends out the output data to the information processing apparatus 10. The camera includes a visible light sensor that is utilized in a general digital camera or a digital video camera such as a charge coupled device (CCD) sensor, a complementary metal oxide semiconductor (CMOS) sensor or the like. The image pickup apparatus 12 may include only one camera or may be a stereo camera in which two cameras are disposed side by side in a known spaced relationship as depicted in FIG. 1.

Alternatively, the image pickup apparatus 12 may be configured by a combination of an apparatus that irradiates reference light such as infrared light or the like on a target and measures reflected light of the irradiated light and a monocular camera. Where a stereo camera or a measurement mechanism of reflection light is introduced, the position of an image pickup object in a three-dimensional actual space can be determined and further diversification of an information process or a display image can be implemented. Both a method for specifying the distance of an image pickup object from a camera by the principle of triangulation using a stereo image picked up from left and right view points by a stereo camera and another method for specifying the distance of an image pickup object from the camera by a method of time of flight (TOF) or pattern irradiation by measurement of reflected light are known widely.

The information processing apparatus 10 outputs data of an image to be displayed on the HMD 18 or the flat panel display 16. The data of the image may be data stored as an originally completed form such as a movie or a picked up moving picture or may be drawn on the real time basis in the inside of the information processing apparatus 10. In the latter case, the information processing apparatus 10 performs general face detection or a chasing process for a picked up image acquired at a predetermined frame rate from the image pickup apparatus 12 to progress a game in which a character on which an action of the user that is an image pickup object is reflected appears or convert a motion of the user into a command input to perform information process.

At this time, the information processing apparatus 10 may acquire a motion of each user utilizing a marker or an acceleration sensor provided on the HMD 18 or the inputting apparatus 14 or may acquire operation information of the user for the inputting apparatus 14 such that the acquired motion or information is reflected on the information process or the display image. For example, by chasing an image of a marker of the HMD 18 in a picked up image, the position or motion of the head of the user is specified. Then, by varying the view point for a virtual world to be displayed on the HMD 18 in response to the specified motion, the user can watch the virtual world corresponding to the own view point and can have the feeling of being at the side or the immersion feeling. In addition to such an image data, the information processing apparatus 10 may output a sound data such as environmental sound or conversation.

The HMD 18 is a display device that displays an image on a display panel such as an organic electroluminescence (EL) panel positioned just in front of the eyes of the user who mounts the HMD 18 on the head thereof. The HMD 18 in the present embodiment displays parallax images in a state in which they are viewed from the left and right points of view in left and right regions into which the display screen is divided such that the image is viewed stereoscopically. Further, the HMD 18 may include an element that emits light in a predetermined color or a light emitting marker configured from a set of such elements, a speaker or an earphone that outputs sound at a position corresponding to an ear of the user, an acceleration sensor for detecting the inclination of the head of the user who mounts the HMD 18 thereon or the like.

The flat panel display 16 may be a television set including a display that outputs a general two-dimensional image and a speaker that outputs sound, and, particularly may be a liquid crystal television set, an organic EL television set, a plasma television set, a personal computer (PC) display unit or the like. Alternatively, the flat panel display 16 may be a display and a speaker of a tablet terminal or a portable terminal. The inputting apparatus 14 accepts, by an operation thereof by the user, a request for start or end of a process, selection of a function, various command inputs or the like and supplies the accepted request as an electric signal to the information processing apparatus 10.

The inputting apparatus 14 may be implemented by one of general inputting apparatus such as a game controller, a keyboard, a mouse, a joystick, a touchpad provided on a display screen of the flat panel display 16 or the like or a combination of them. Further, the inputting apparatus 14 may include a light emitting marker configured from an element that emits light in a predetermined color or a set of such elements. In this case, if the information processing apparatus 10 chases the movement of the marker using picked up images, then the movement of the inputting apparatus 14 itself can be made a user operation. It is to be noted that the inputting apparatus 14 may be configured only from a light emitting marker having a grip portion.

Figure 2:
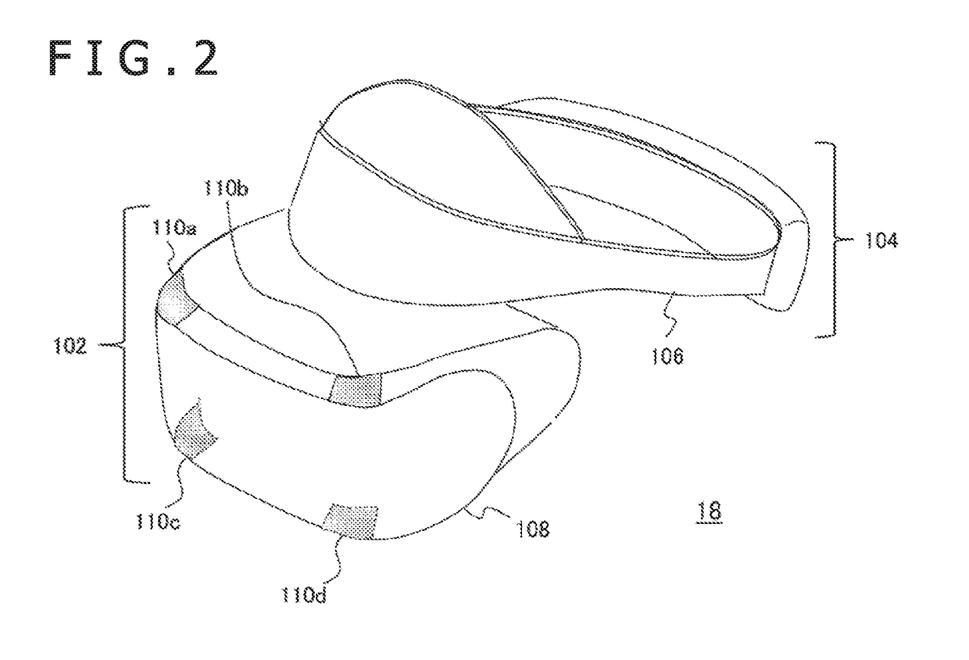
FIG. 2 is a view depicting an example of an appearance shape of an HMD in the present embodiment.

FIG. 2 depicts an example of an appearance shape of the HMD 18. In this example, the HMD 18 is configured from an outputting mechanism unit 102 and a mounting mechanism unit 104. The mounting mechanism unit 104 includes a mounting band 106 that goes round the head and implements fixation of the apparatus when the HMD 18 is mounted on the user. The mounting band 106 has a material or a structure by which the length can be adjusted in accordance with the head circumference of the user. The mounting band 106 may be configured from an elastic body such as, for example, rubber or utilizing a buckle, a gear or the like.

The outputting mechanism unit 102 includes a housing 108 having such a shape that the left and right eyes of the user are covered in a state in which the user mounts the HMD 18 thereon, and includes a display panel in the inside thereof so as to confront the eyes. The display panel is implemented by a liquid crystal panel, an organic EL panel or the like. Further, a pair of lenses positioned between the display panel and the eyes of the user when the HMD 18 is mounted and enlarges the angle of view of the user are provided in the inside of the housing 108. Further, the HMD 18 may include a speaker or an earphone at a position corresponding to an ear of the user upon mounting.

Light emitting markers 110a, 110b, 110c, and 110d are provided on the outer face of the housing 108. While the number or disposition of light emitting markers is not limited specifically, the light emitting markers in the example FIG. 2 are provided at the four corners on the front face of the housing of the outputting mechanism unit 102. Further, the light emitting markers may be provided also on the opposite side faces in the rear of the mounting band 106. It is to be noted that, since the light emitting markers 110c and 110d are provided at the lower side of the outputting mechanism unit 102 and are not viewed originally from the point of view of the FIG. 2, the outer periphery is represented by a broken line.

Figure 3:
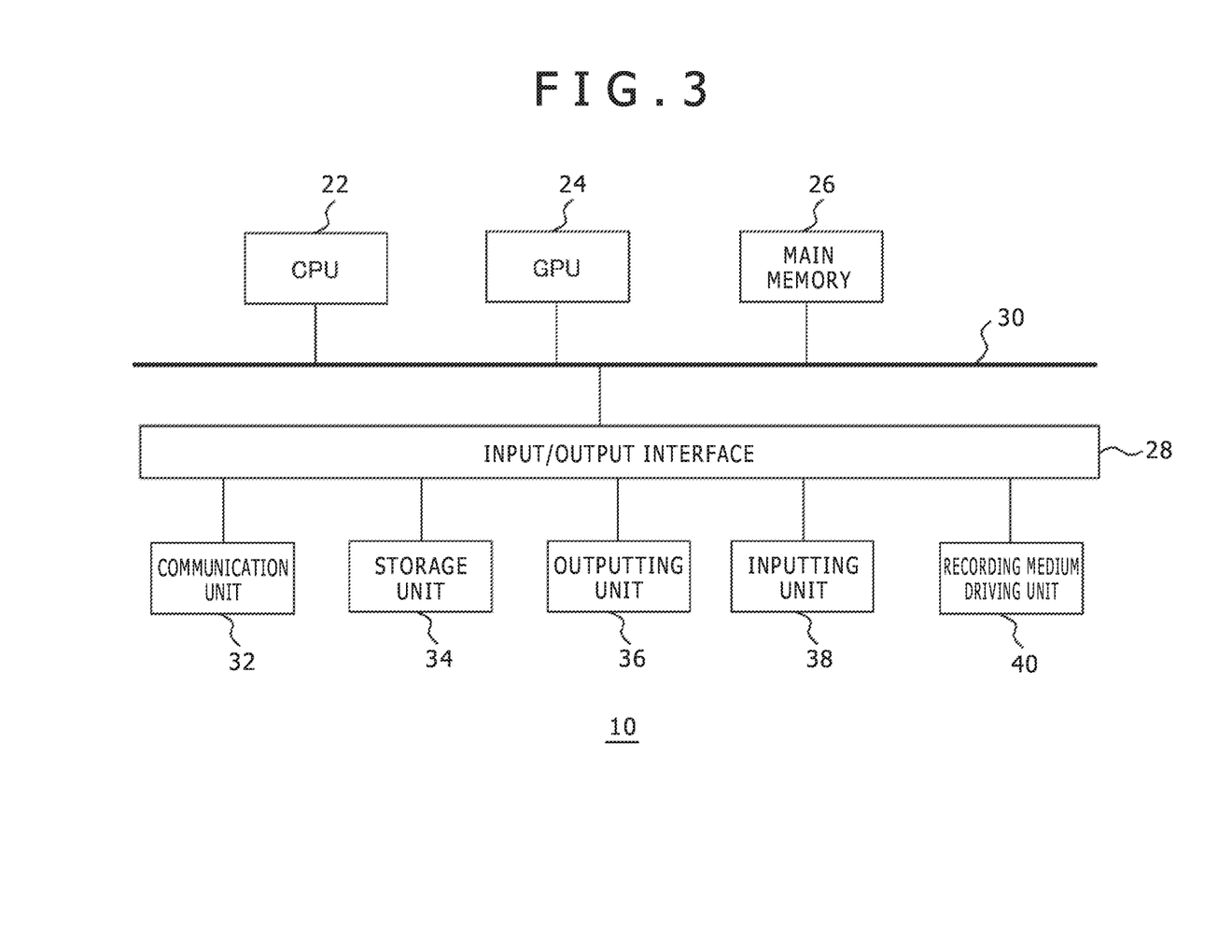
FIG. 3 is a view depicting an internal circuit configuration of an information processing apparatus in the present embodiment.

FIG. 3 depicts a configuration of an internal circuit of the information processing apparatus 10. The information processing apparatus 10 includes a central processing unit (CPU) 22, a graphics processing unit (GPU) 24, and a main memory 26. The components are coupled to each other through a bus 30. Further, an input/output interface 28 is connected to the bus 30. To the input/output interface 28, a communication unit 32 configured from a peripheral apparatus interface such as a universal serial bus (USB) and Institute of Electrical and Electronics Engineers (IEEE) 1394 interface and a network interface of a wired or wireless local area network (LAN), a storage unit 34 such as a hard disk drive or a nonvolatile memory, an outputting unit 36 for outputting data to an external apparatus, an inputting unit 38 for inputting data from an external apparatus, and a recording medium driving unit 40 that drives a removable recording medium such as a magnetic disk, an optical disk, a semiconductor memory or the like are coupled.

The CPU 22 executes an operating system stored in the storage unit 34 to control the entire information processing apparatus 10. The CPU 22 further executes various programs read out from a removable recording medium and loaded into the main memory 26 or downloaded through the communication unit 32. The GPU 24 has a function of a geometry engine and a function of a rendering processor, and performs a drawing process in accordance with a drawing instruction from the CPU 22 and outputs data from the outputting unit 36 to the HMD 18 or the like. The main memory 26 is configured from a random access memory (RAM) and stores a program or data necessary for process.

Figure 4:
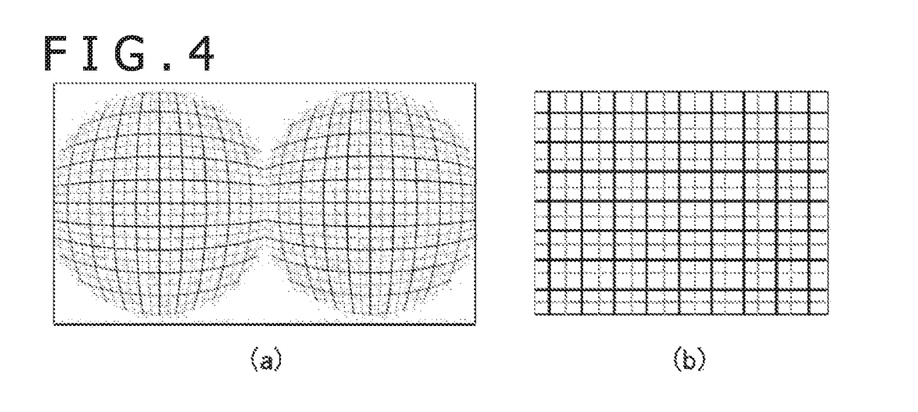
FIG. 4 is a view illustrating images displayed on the HMD and a flat panel display in the present embodiment.

FIG. 4 is a view illustrating images displayed on the HMD 18 and the flat panel display 16. The image (a) at the left side in FIG. 4 is an image displayed on the HMD 18 and the image (b) at the right side is a general image displayed on the flat panel display 16. While a grating picture is a display target in FIG. 4 for the object of understandability, various images are actually displayed depending upon the substance of information process or a virtual world, a game image or the like. In order to implement stereoscopic vision of an image, the image (a) for the HMD 18 is configured such that a pair of parallax images including a left-eye image and a right-eye image are disposed in left and right regions into which an image plane corresponding to the display panel is bisected.

As described above, the HMD 18 of the present embodiment is structured such that a lens for widening the visual field of the user is provided in front of the display panel. In this case, in an image displayed on the display panel, distortion of "bobbin type" by which a pixel spaced by a greater distance from the center is extended by a greater displacement is caused by a lens is generated. Since the displacement amount differs among different colors, also chromatic aberration occurs. Accordingly, distortion correction for distorting an image in the opposite direction taking the distortion and the chromatic aberration into consideration is performed in advance such that such a "barrel shape" image like the image (a) is displayed. Consequently, when the image is viewed through a lens, such an original image as the image (b) looks stereographically.

A general method can be applied for the distortion correction for a lens. The information processing apparatus 10 generates and outputs image data such as an image (a) as a display image for an HMD to the HMD 18. Here, a peripheral region of a region of the image distorted in a barrel shape from within the image (a) is an invisible region that cannot be viewed from the user when it is viewed through a lens. In the present embodiment, by representing predetermined information in the form of a graphics or the like in the invisible region, the information is reflected on the displaying process in the HMD 18. It is to be noted that, in a mode in which a similar image is displayed on the flat panel display 16, the information processing apparatus 10 may output image data of the image (b) or the like to the flat panel display 16.

Figure 5:
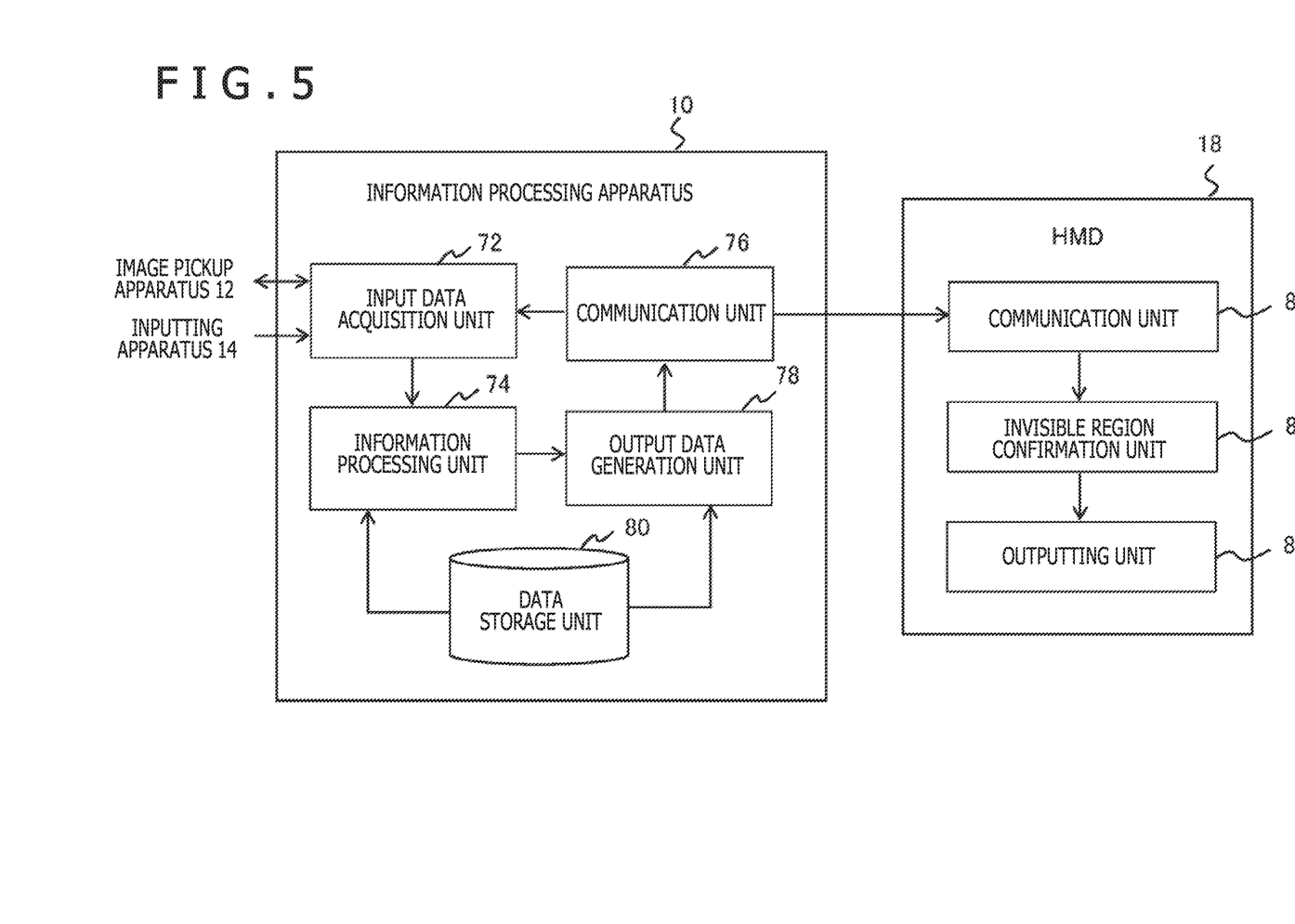
FIG. 5 is a view depicting a configuration of functional blocks of the information processing apparatus and the HMD in the present embodiment.

FIG. 5 depicts a configuration of functional blocks of the information processing apparatus 10 and the HMD 18. The functional blocks depicted in FIG. 5 can be implemented, in hardware, by a CPU, a GPU, various memories, a microprocessor and so forth or can be implemented, in software, by a program that is loaded from a recording medium or the like into a memory and has various functions such as a data inputting function, a data storage function, an image processing function, a communication function and so forth. Accordingly, it is understood by those skilled in the art that the functional blocks can be implemented by various forms such as from only hardware, from only software, or from a combination of the hardware and software, and the implementation of them is not limited to any of them.

The information processing apparatus 10 includes an input data acquisition unit 72 for acquiring input data from the image pickup apparatus 12 and the inputting apparatus 14, an information processing unit 74 for performing information process in accordance with an application to be executed such as a game, an output data generation unit 78 for generating data to be outputted as a result of the information process such as a game image or sound of the game, a communication unit 76 for establishing communication with the HMD 18, and a data storage unit 80 for storing basic data necessary for generation of output data.

The input data acquisition unit 72 successively acquires an image picked up by the image pickup apparatus 12 at a predetermined frame rate. Further, information indicative of the substance of a user operation through the inputting apparatus 14 is acquired. Here, the user operation may be an operation performed in general information processes such as selection of an application to be executed, start/end of process, command inputting and so forth. Then, the input data acquisition unit 72 supplies the acquired information to the information processing unit 74.

Further, the input data acquisition unit 72 may acquire a result of measurement by an acceleration sensor in the inside of the HMD 18 from the communication unit 76 and supply the measurement result to the information processing unit 74. Further, the input data acquisition unit 72 may control start/end of image pickup by the image pickup apparatus 12 in accordance with a processing starting/ending request from the user acquired from the inputting apparatus 14 or may control the type of data acquired from the image pickup apparatus 12 in response to a result of the process by the information processing unit 74. However, data acquired by the input data acquisition unit 72 may differ depending upon the substance of the information process to be executed by the information processing unit 74.

The information processing unit 74 carries out information process of a game designated by the user or the like. The information process may include a process for detecting and chasing an image of an object from a picked up image or the like. Part of the body of the user such as, for example, the head or a hand may be chased utilizing a contour line or an object having a specific pattern or shape may be chased by pattern matching. A general image processing technology may be applied to the chasing processes just described. Further, the position or the posture of the head of the user may be specified in detail by integrating information of the measurement values by the acceleration sensors and so forth transmitted from the HMDs 18. The information processing unit 74 progresses a game or performs a corresponding process using a movement or a position of the user obtained in such a manner as described above as an input value or using a user operation through the inputting apparatus 14 as an input value. However, the substance of the information process is not limited to them.

The output data generation unit 78 generates data of an image or sound to be outputted as a result of the information process. For example, as described above, the output data generation unit 78 generates data of an image in which left and right parallax images of a virtual world as viewed from a point of view corresponding to the position or the posture of the head of the user are disposed side by side after being drawn and subjected to distortion correction with a lens taken into consideration. If the images are displayed in front of the left and right eyes at a predetermined frame rate on the HMD 18 and sound in the virtual world is outputted further, then the user can have such a sense as if the user had entered a virtual world.

Here, the output data generation unit 78 embeds information by putting a predetermined color on the invisible regions of the image described above or some of the invisible regions or by representing a predetermined pattern in the region. For example, a graphics indicating that the generated image data is proper is displayed or represented by a color. By this, the HMD 18 can decide by a simple and easy confirmation process whether or not the image data is proper image data generated for the HMD 18 by the information processing apparatus 10. Alternatively, information for designating output adjustment of a display panel or a speaker in the inside of the HMD 18 may be embedded in response to a scene change of the substance.

Basic data necessary for the process by the information processing unit 74 or the output data generation unit 78 is stored in the data storage unit 80 in advance. The data includes also information to be embedded into image data and correspondence information between a color and a graphics for representing the information in an invisible region. The communication unit 76 establishes communication with the HMD 18 by a predetermined protocol such as high-definition multimedia interface (HDMI) (registered trademark) or USB and transmits output data of the image or sound generated by the output data generation unit 78.

The HMD 18 includes a communication unit 82 for acquiring output data transmitted from the information processing apparatus 10, an invisible region confirmation unit 84 for confirming the color or the graphics represented in an invisible region from within an image included in the output data, and an outputting unit 86 for outputting the image or the sound of the output data outputted from the display panel or the speaker. The communication unit 82 establishes communication with the information processing apparatus 10 by a predetermined protocol and acquires output data transmitted from the information processing apparatus 10 at a predetermined rate. Further, the communication unit 82 may suitably transmit a measurement value by an acceleration sensor in the inside of the HMD 18 or the like to the information processing apparatus 10.

The invisible region confirmation unit 84 confirms a color or a graphics represented in an invisible region of the image from within output data acquired by the communication unit 82 and interprets embedded information. To this end, the invisible region confirmation unit 84 retains data, in which the color or graphics and the information represented by the color or graphics are associated with each other, in an internal memory thereof. Then, when the data is referred to on the basis of the graphics or the like represented in the invisible region, only if the output is proper, the output data is supplied to the outputting unit 86. Further, if output adjustment of the display panel or the speaker is designated, then a request for adjustment is issued to the outputting unit 86.

The outputting unit 86 is implemented by a display panel and a speaker, a mechanism for controlling an outputting state of them, and so forth, and displays an image or outputs sound using output data supplied from the invisible region confirmation unit 84. If a request for output adjustment is received from the invisible region confirmation unit 84, then the outputting unit 86 performs adjustment in accordance with the request. Since a general technique can be used for a particular processing procedure for image display, sound outputting, and control of an outputting state, description of the same is omitted herein.

Figure 6:
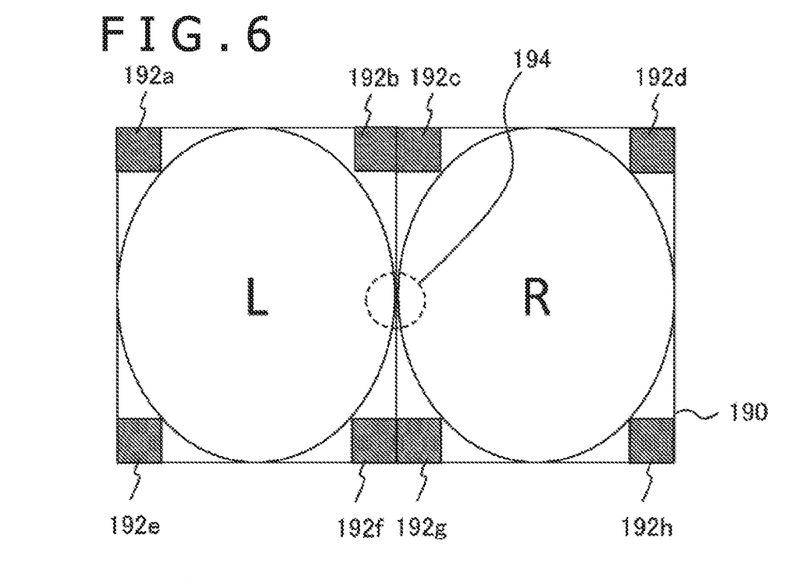
FIG. 6 is a view depicting an example of an image for an HMD in which information is embedded in an invisible region in the present embodiment.

FIG. 6 depicts an example of an image for an HMD in which information is embedded in an invisible region. In an image 190, ellipses denoted by "L" and "R" indicate regions for left and right parallax images distorted in a barrel shape taking a lens into consideration as depicted in the image (a) of FIG. 4. Accordingly, regions around the regions for the left and right parallax images become invisible regions. In the example of FIG. 6, information is represented by rectangular graphics 192a to 192h at the four corners of the left half region including an image for the left eye and the right half region including an image for the right eye.

For example, where information is represented by the color of the graphics 192a to 192h, by representing three factors of red, green, and blue by 0 or a maximum gradation, information of eight patterns can be represented even if all graphics are represented by a same color. By providing great differences to the pixel values in this manner, even if the color space is varied delicately by various processes performed after the image is generated by the output data generation unit 78 of the information processing apparatus 10 until the invisible regions are confirmed by the invisible region confirmation unit 84, the embedded information can be prevented from being misrecognized. The information amount can be increased further if the colors of the graphics 192a to 192h are not made same as each other and information is represented by a combination of a position and a color.

The information amount may be increased more not only by representing information by fill colors in the graphics 192a to 192h but also by providing variations to the internal pattern or the shape of the graphics 192a to 192h themselves. However, even in this case, it is preferable to provide a great difference in pattern or shape such that misrecognition does not occur even if some distortion appears with a graphics from an influence of a process involved until an invisible region is confirmed. For example, it is a possible idea to provide a difference by a vertical line and a horizontal line or by vertical stripes and horizontal stripes. Alternatively, information of different types may be embedded depending upon the position of the image.

It is to be noted that, in addition to utilization of only some of the invisible regions as depicted in FIG. 6, information may be represented by a color of the entire invisible regions. Furthermore, information may be embedded similarly not only in the depicted regions but also in any region that is invisible or not viewed readily by the user. For example, since a region 194 in the proximity of the center of the display panel is positioned just before the position between the opposite eyes of the user, it is likely to become invisible. Even if this region is utilized to represent information in color or graphics, the display mode of the HMD 18 can be controlled by a similar process without allowing the user to be conscious of this. It is to be noted that, although the region 194 in FIG. 6 has a circular shape, it is not intended to restrict the shape of the region 194 to this.

Figure 7:
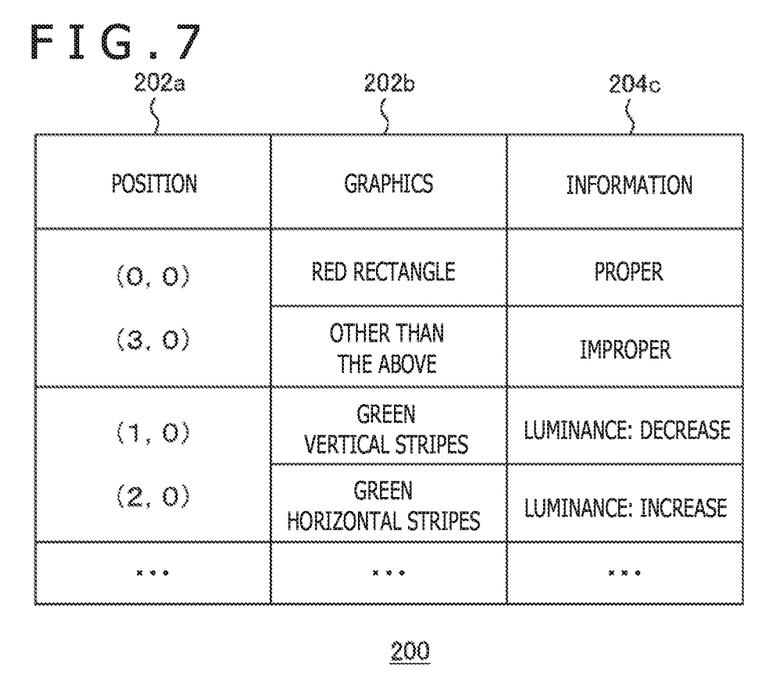
FIG. 7 is a view depicting an example of a structure of data representing correspondence between patterns to be represented in an invisible region and information indicated by the patterns in the present embodiment.

FIG. 7 depicts an example of a structure of data representative of correspondence between graphics to be represented in the invisible regions and information represented by them. An embedded information setting table 200 includes a position column 202a, a graphics column 202b, and an information column 204c. In the position column 202a, a display position of a graphics representative of information in an invisible region of an image outputted from the information processing apparatus 10 is set. In the example of FIG. 7, the eight positions represented by the graphics 192a to 192h of the image 190 of FIG. 6 are set in advance, and some of them are represented by coordinates of (number in the horizontal direction, number in the vertical direction).

In the graphics column 202b, an attribute of a graphics such as color, pattern, or shape is set, and in the information column 204c, information indicated by a graphics set in the graphics column 202b when the graphics is represented at the position set in the position column 202a is set. For example, if "red rectangle" is represented at the positions of (0, 0) and (3, 0) as set in the second row of the embedded information setting table 200 depicted in FIG. 7, then this indicates that the image is proper. On the other hand, if any other graphics is represented at the position as set in the third row or no graphics is represented, then since the image is improper, it is not displayed.

Where the information processing apparatus 10 adds such a graphics as described above to an image drawn by the information processing apparatus 10 itself before outputting, the HMD 18 that receives the image data can decide readily that the image is proper. If an image generated once is subjected to some process later or an image is generated by an apparatus whose identity is not clear, then from such a reason that the parallax between the left and right images is not appropriate or a like reason, there is the possibility that the user may suffer from poor physical condition or visual impair if the user continues to view the image.

Where the safety is ensured immediately before outputting to the HMD 18 and the HMD 18 displays an image only where the safety is ensured as described above, such possibility as described above can be excluded. Even if video data is stored once, by adding a predetermined graphics to the video data if the video data is a genuine one, the possibility described above can be excluded similarly. Further, where predetermined colors different from each other are represented in the invisible regions in the left half and the right half, if the image for the left eye and the image for the right eye are disposed reversely from some reason, then this situation may be detected to prevent the images from being displayed.

Further, where "green vertical stripes" are represented at the positions of (1, 0) and (2, 0) as set in the fourth row of the embedded information setting table 200, this indicates an instruction for reducing the luminance of the display panel. On the other hand, if "green horizontal stripes" are represented at the positions as set in the fifth row, then this indicates an instruction for increasing the luminance of the display panel. For example, in such a case that the brightness of a virtual world to be drawn changes by a great amount, it is sometimes desirable to adjust the luminance. Therefore, the information processing apparatus 10 determines an appropriate luminance depending upon a scene to be drawn or the like and represents a graphics at the pertaining position as occasion demands to cause the HMD 18 to adjust the luminance. The picture quality such as the contrast, color or the like may be adjusted. In addition to the adjustment of the display panel, the volume of sound or the balance of sound of the speaker may be adjusted.

By doing this, it is possible to display an image normally in an optimum state or output sound without requiring the labor of the user and adjust the representation of a scene with great stimulation such as blinking of strong light in an easing direction at a timing immediately before start of the scene, and an unexpected poor physical condition by a visual effect or the like is less likely to occur. It may be made possible for the user to set in advance whether or not such an easing process as described above is to be performed. It is to be noted that the format of setting and the substance of setting depicted in the figure are an example, and variable modifications may be available. The graphics indicating, for example, that the image is proper may be made more complicated such that the image cannot be imitated readily. Alternatively, by providing variations to the color or thickness of the stripe patterns, the ratio at which the luminance is to be changed may be designated particularly.

The embedded information setting table 200 is stored in the data storage unit 80 of the information processing apparatus 10, and the output data generation unit 78 refers to the embedded information setting table 200 in accordance with a request from the information processing unit 74 to add a particular graphics to an output image. Further, the embedded information setting table 200 is stored into an internal memory of the invisible region confirmation unit 84 of the HMD 18, and on the basis of the graphics, information indicated by the graphics is specified. The information processing apparatus 10 may embed information into images of all frames or may periodically embed information at predetermined intervals. In any case, by continuously representing necessary graphics, it is possible to perform amendment immediately even if the information processing apparatus 10 temporarily fails in detection or misrecognizes.

Further, by this, it is possible to cope even with a case in which the situation changes with respect to time like adjustment for each scene described hereinabove. It is to be noted that final decision may be performed after it is confirmed that the same graphics has been detected continuously for a predetermined period of time at the same position such that the specification accuracy of information is improved. Further, such continuity of a graphics on the time axis may be made most of such that information is represented by a pattern of a change of a color of a graphics at the same position, a duration time of each color or the like.

Figure 8:
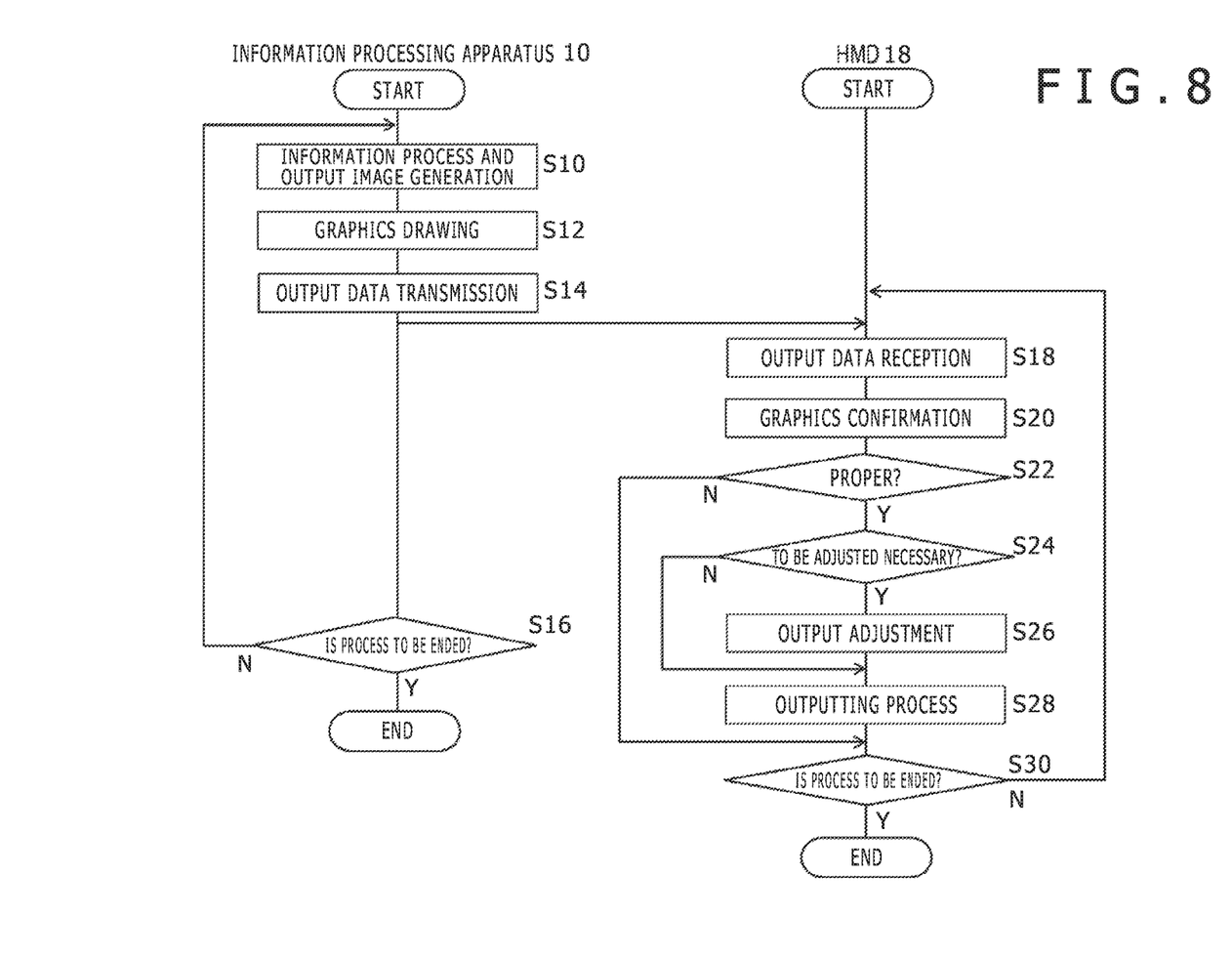
FIG. 8 is a flow chart illustrating a processing procedure when the information processing apparatus and the HMD of the present embodiment perform data output.

Now, action of the information processing system 8 implemented by the configuration described above is described. FIG. 8 is a flow chart illustrating a processing procedure when the information processing apparatus 10 and the HMD 18 perform data outputting. This flow chart is started in response to a request for start of process issued with a game or the like designated through the inputting apparatus 14 by the user. First, the information processing apparatus 10 performs a process of a designated game or the like and starts generation of an output image (S10). Then, the information processing apparatus 10 draws a necessary graphics at a position set in an invisible region in accordance with such setting substance of the embedded information setting table 200 as illustrated in FIG. 7 (S12). It is to be noted that, as described hereinabove, filling of an invisible region or the like may be applied depending upon the setting substance.

Data of the image generated in this manner is transmitted suitably in combination with data of sound or the like as output data to the HMD 18 (S14). While there is no necessity to end the process, the information processing apparatus 10 similarly continues generation and transmission processes of an image for outputting at a predetermined frame rate (N at S16, and S10 to S14). On the other hand, the HMD 18 receives the output data transmitted from the information processing apparatus 10 (S18). Consequently, the invisible region confirmation unit 84 confirms presence or absence of a graphics in an invisible region or an attribute of the graphics (S20).

The output data is collated with the embedded information setting table 200 held in the internal memory and, if it is proved that the data is appropriate data (Y at S22) and it is necessary to adjust the output such as the luminance or the like (Y at S24), then the HMD 18 outputs the data after it performs output adjustment (S26 and S28). If it is proved that the data is appropriate data (Y at S22) and there is no necessity to adjust the output such as the luminance or the like (N at S24), then the HMD 18 outputs the data as it is (S28). If the data is not appropriate data, then the HMD 18 does not perform outputting of the output data (N at S22).

It is to be noted that, in this case, a warning may be issued to the user by display or sound, or a notification of this may be issued to the information processing apparatus 10. Alternatively, the data may be outputted tentatively by generally thinning the display color or the like. While there is no necessity to end the process, the HMD 18 repeats the processes at S18 to S28 for output data for each frame transmitted from the information processing apparatus 10 (N at S30). Consequently, a moving image or sound of a game screen is displayed normally in an appropriate state on each HMD 18. If the user inputs an ending request or the game comes to an end and it becomes necessary to end the process thereby, then the information processing apparatus 10 ends all processes (Y at S16). Also the HMD 18 ends all processes if it becomes necessary to end the process in response to a notification from the information processing apparatus 10 or the like (Y at S30).

According to the embodiment described above, a color, a graphics, a pattern or the like is represented in an invisible region that is not viewable from the user from within an image for an HMD which has been corrected taking distortion by a lens into consideration to embed information into the invisible region. For example, by representing a graphics indicating that the image is proper, whether or not outputting is appropriate is determined after confirmation by the HMD side. Consequently, poor physical condition or visual impair caused by continuously viewing an inappropriate image that is inappropriate in terms of the parallax arising from illegal process or the left and right images are reversed in position can be prevented. Further, by embedding information relating to physical adjustment of the luminance, contrast or the like, adjustment is performed automatically in response to a change of a scene, and a normally agreeable output environment can be provided, and also poor physical condition or the like arising from an excessive audiovisual stimulus can be prevented.

By embedding information into an invisible region, no apparent influence is had on a display image on an HMD and also the data size to be transmitted does not change. Further, since simple information that can be discriminated from a simple graphics or a difference in color is conveyed, an advanced information processing module for detection of the embedded information or for a process ready for this is not required. As a result, a necessary process can be carried out with certainty without increasing the weight or the size of the HMD and thereby causing the user to feel cumbersomeness.

The present invention has been described on the basis of the embodiment. The embodiment described above is exemplary, and it is recognized by those skilled in the art that various modifications are possible in the combination of the components and processes of the embodiment and also that such modifications fall within the scope of the present invention.

REFERENCE SIGNS LIST

Information processing system, 10 Information processing apparatus, 12 Image pickup apparatus, 14 Inputting apparatus, 16 Flat panel display unit, 18 HMD, 72 Input data acquisition unit, 74 Information processing unit, 76 Communication unit, 78 Output data generation unit, 80 Data storage unit, 82 Communication unit, 84 Invisible region confirmation unit, 86 Outputting unit.

INDUSTRIAL APPLICABILITY

As described above, the present invention can be utilized in computers, display apparatus, game apparatus, information processing apparatus, and image processing apparatus that process various electronic contents and systems and so forth that include the apparatus mentioned.

The invention claimed is:

1. A head-mounted display including a lens provided on a front face of a display panel, the head-mounted display comprising:
   an inputting unit configured to acquire content data outputted from an information processing apparatus;
   an invisible region confirmation unit configured to confirm an image represented in a region that is invisible when a user views through the lens from within a frame of a moving image included in the content data to specify a notification matter from the information processing apparatus; and
   an outputting unit configured to perform one of changes in output mode of the content data including output stop based on the notification matter.

2. The head-mounted display according to claim 1, wherein, when an image indicating that the content data is proper is not represented, the outputting unit stops outputting of the content data.

3. The head-mounted display according to claim 1, wherein, when an image indicative of an adjustment request for an output value of the display panel is represented, the outputting unit adjusts the output value of the display panel in accordance with the adjustment request.

4. The head-mounted display according to claim 1, wherein the invisible region confirmation unit specifies the notification matter from the information processing apparatus based on an attribute of an image represented in the region that is invisible and a display position of the image.

5. The head-mounted display according to claim 1, wherein the invisible region confirmation unit specifies the notification matter from the information processing apparatus based on an attribute of an image represented in the region that is invisible, a display position of the image, and a time variation of the image.

6. The head-mounted display according to claim 1, wherein the invisible region confirmation unit specifies the notification matter from the information processing apparatus based on at least one of a color, a pattern, and a graphics shape represented in the region that is invisible.

7. An information processing system including a head-mounted display that includes a lens on a front face of a display panel and an information processing apparatus that generates content data to be outputted to the head-mounted display, wherein
   the information processing apparatus includes
   an output data generation unit configured to generate data to be outputted to the head-mounted display and represent an image indicating that the data is proper in a region, which is invisible when a user views through the lens of the head-mounted display, within a frame of a moving image included in the data to generate final content data, and
   an outputting unit configured to output the content data generated by the output data generation unit to the head-mounted display, and
   the head-mounted display includes
   an inputting unit configured to acquire content data outputted from the information processing apparatus,
   an invisible region confirmation unit configured to confirm an image represented in a region that is invisible from within a frame of a moving image included in the content data to specify a notification matter from the information processing apparatus, and
   an outputting unit configured to perform one of changes in output mode of the content data including output stop based on the notification matter.

8. A content data outputting method by a head-mounted display that includes a lens on a front face of a display panel, the content data outputting method comprising:
   acquiring content data outputted from an information processing apparatus;
   confirming an image represented in a region that is invisible when a user views through the lens from within a frame of a moving image included in the content data to specify a notification matter from the information processing apparatus; and
   performing one of changes in output mode of the content data including output stop based on the notification matter.

* * * * *